Dec. 12, 1933.    R. E. SMITH    1,938,669
SPREADER
Filed Sept. 30, 1931    5 Sheets-Sheet 1

INVENTOR
Ralph E. Smith
BY Toulmin & Toulmin
ATTORNEYS

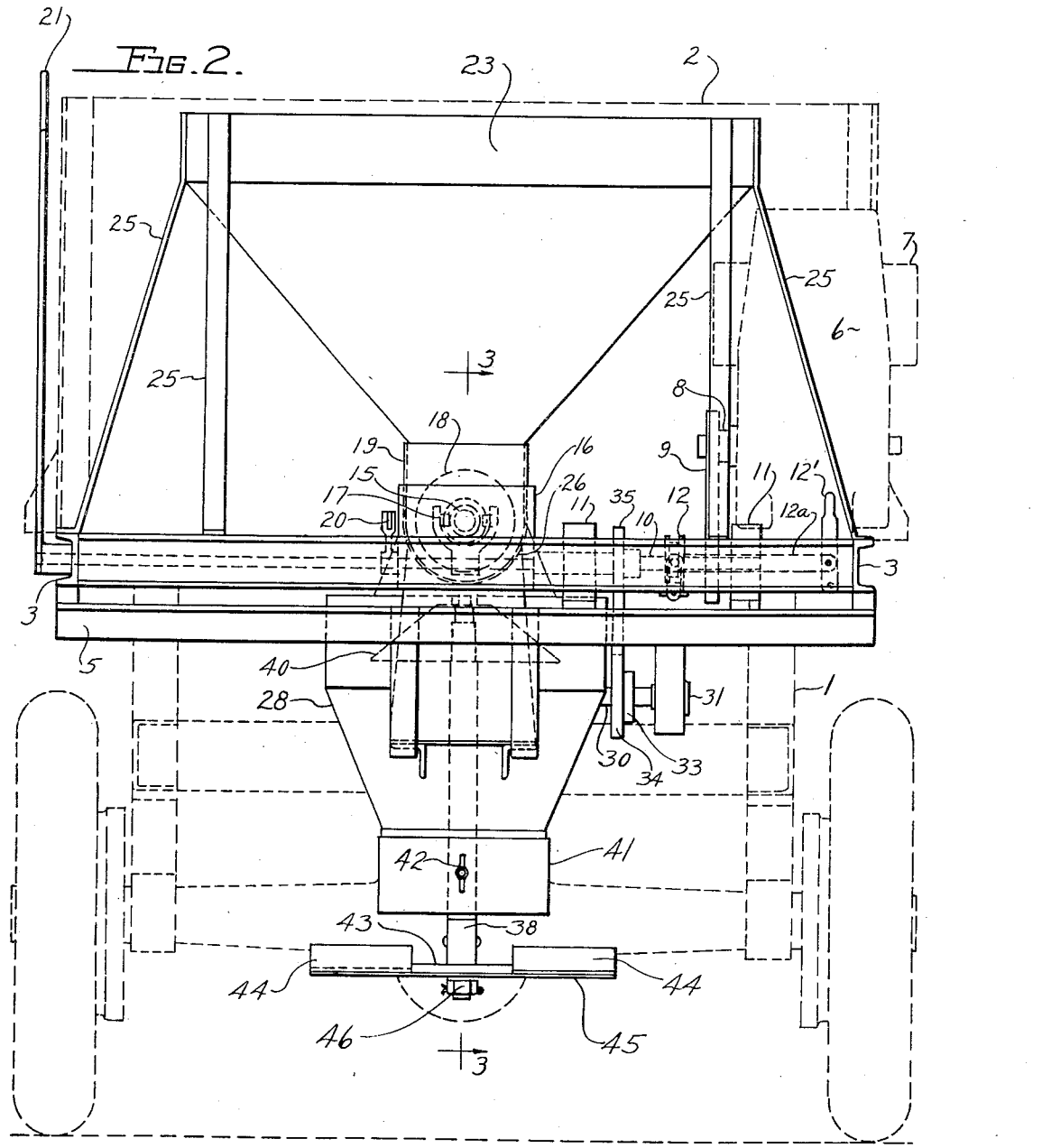

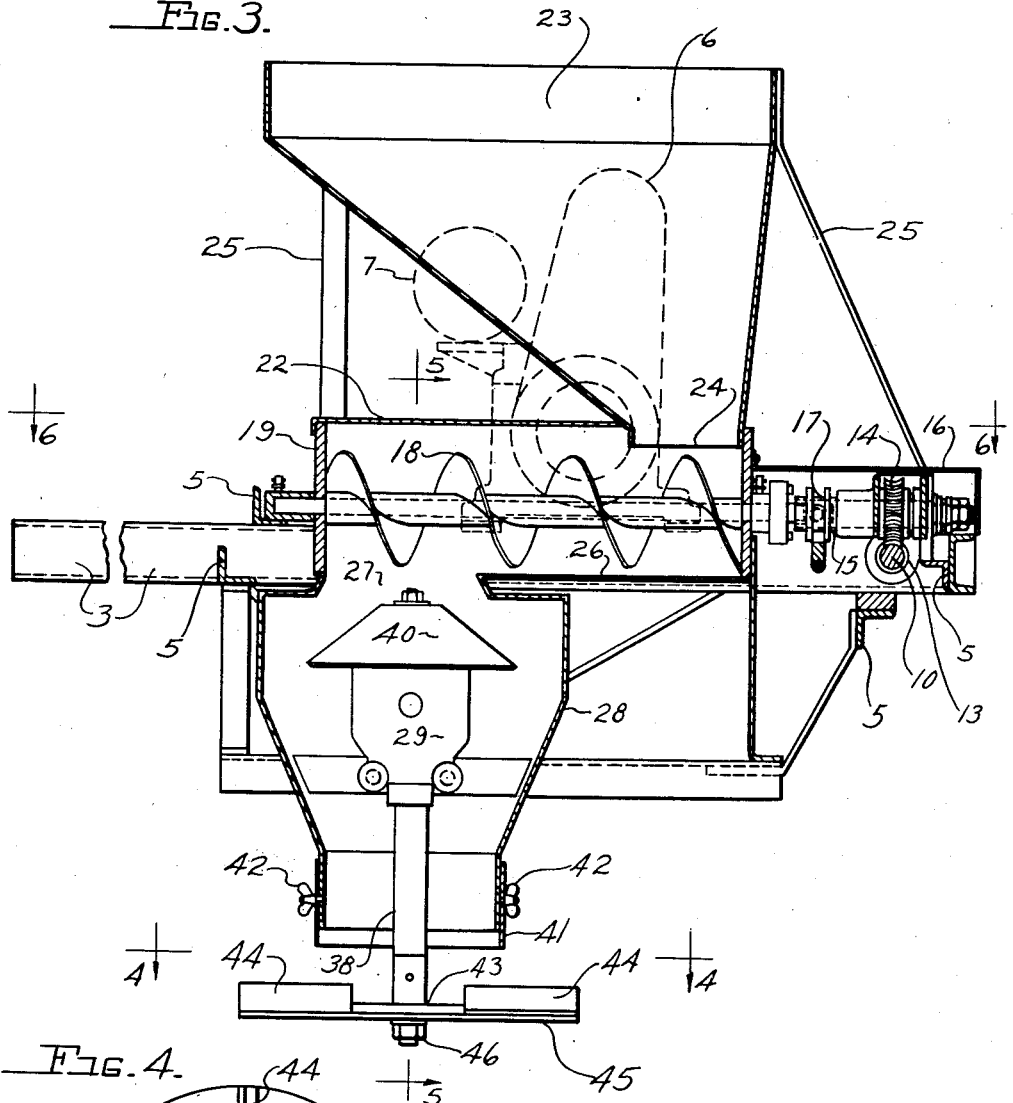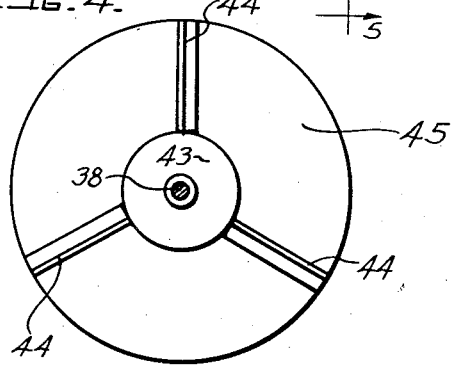

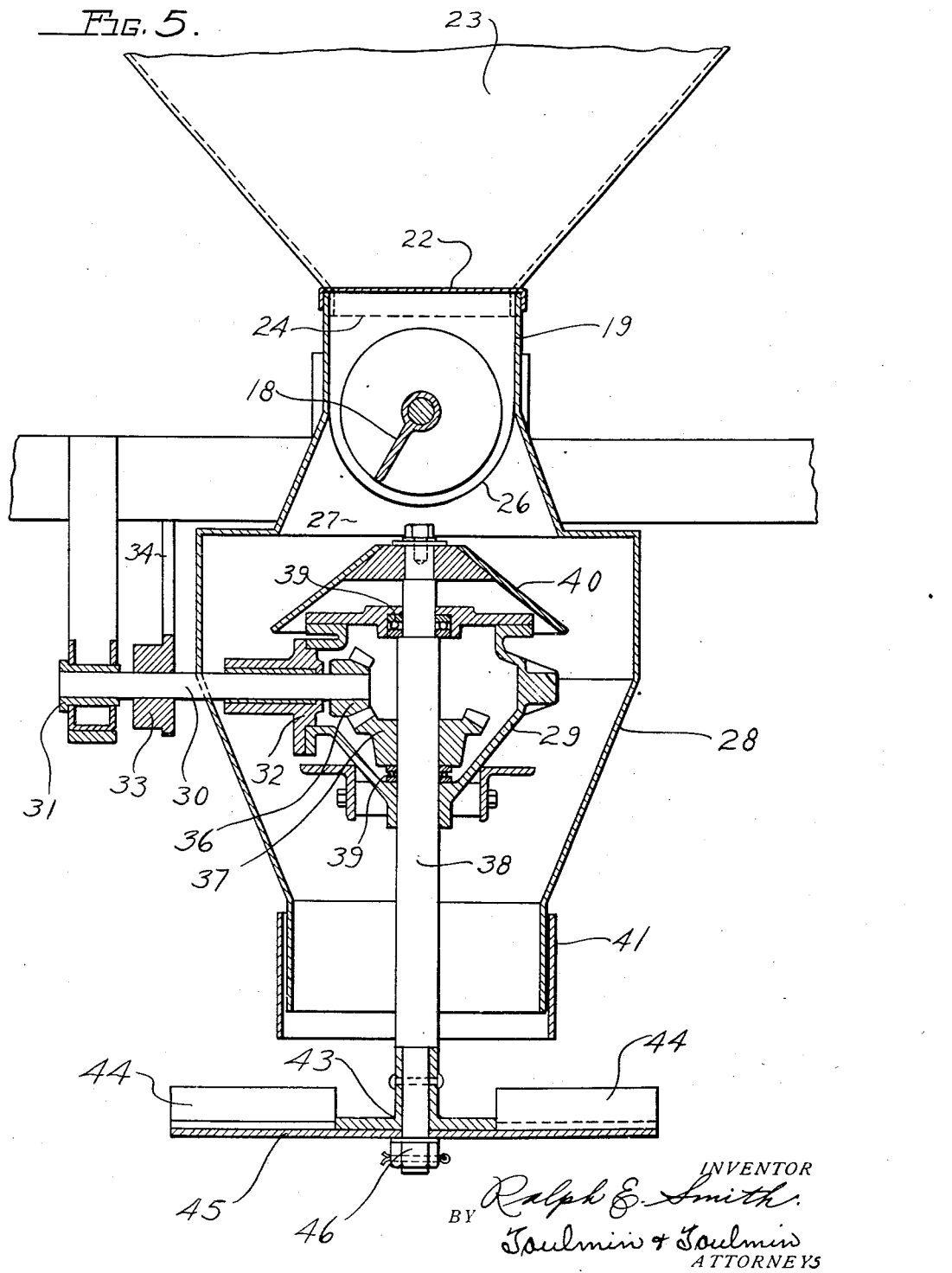

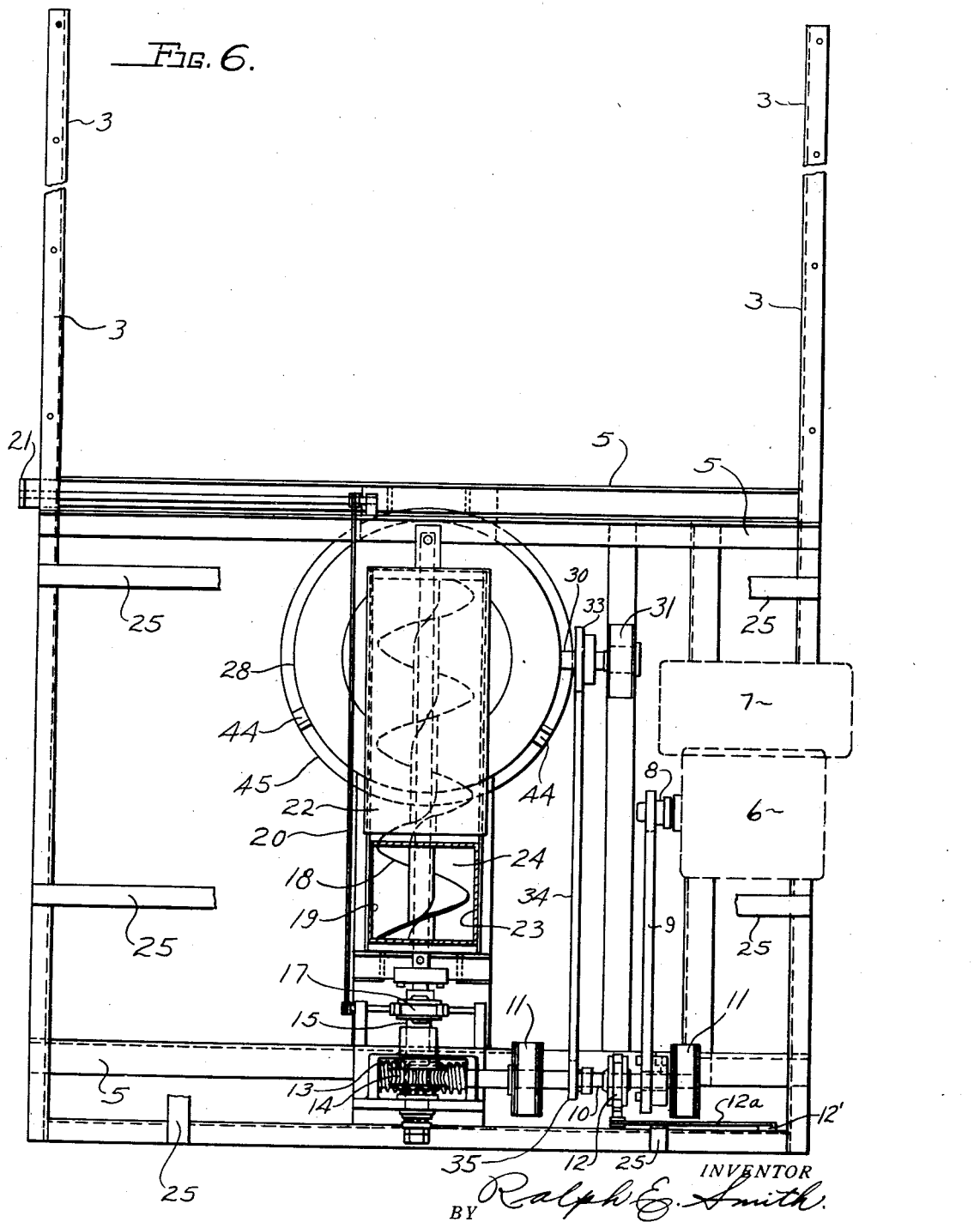

Patented Dec. 12, 1933

1,938,669

UNITED STATES PATENT OFFICE 1,938,669

SPREADER

Ralph E. Smith, Galion, Ohio, assignor to The Galion Metallic Vault Co., Galion, Ohio, a corporation of Ohio Application September 30, 1931
Serial No. 566,052

20 Claims. (Cl. 275—8)

This invention relates to spreaders, and has for its object to provide an apparatus for spreading crushed stone, gravel, calcium chloride, salt, cinders, oil and the like.

It is particularly the object of this invention to provide a spreader that may be easily attached, by means of a few bolts, to the subframe of a dump body, and which may be driven from the motor of the vehicle carrying the dump body by a suitable take-off mechanism, or it may be operated by a motor forming part of the spreader attachment.

It is particularly the object of this invention to provide, in connection with a spreader, a plurality of hoppers, with means to convey the material from one hopper to the other, and means to distribute the material as it leaves the last hopper.

These and other advantages will appear from the following description taken in connection with the drawings.

Referring to the drawings:

Figure 2 is a rear elevation of the spreader attached to the rear of the dump body.

Figure 3 is a section on the line 3—3 of Figure 2.

Figure 4 is a section on the line 4—4 of Figure 3.

Figure 5 is a section on the line 5—5 of Figure 3.

Figure 6 is a section on the line 6—6 of Figure 3.

Figure 1:
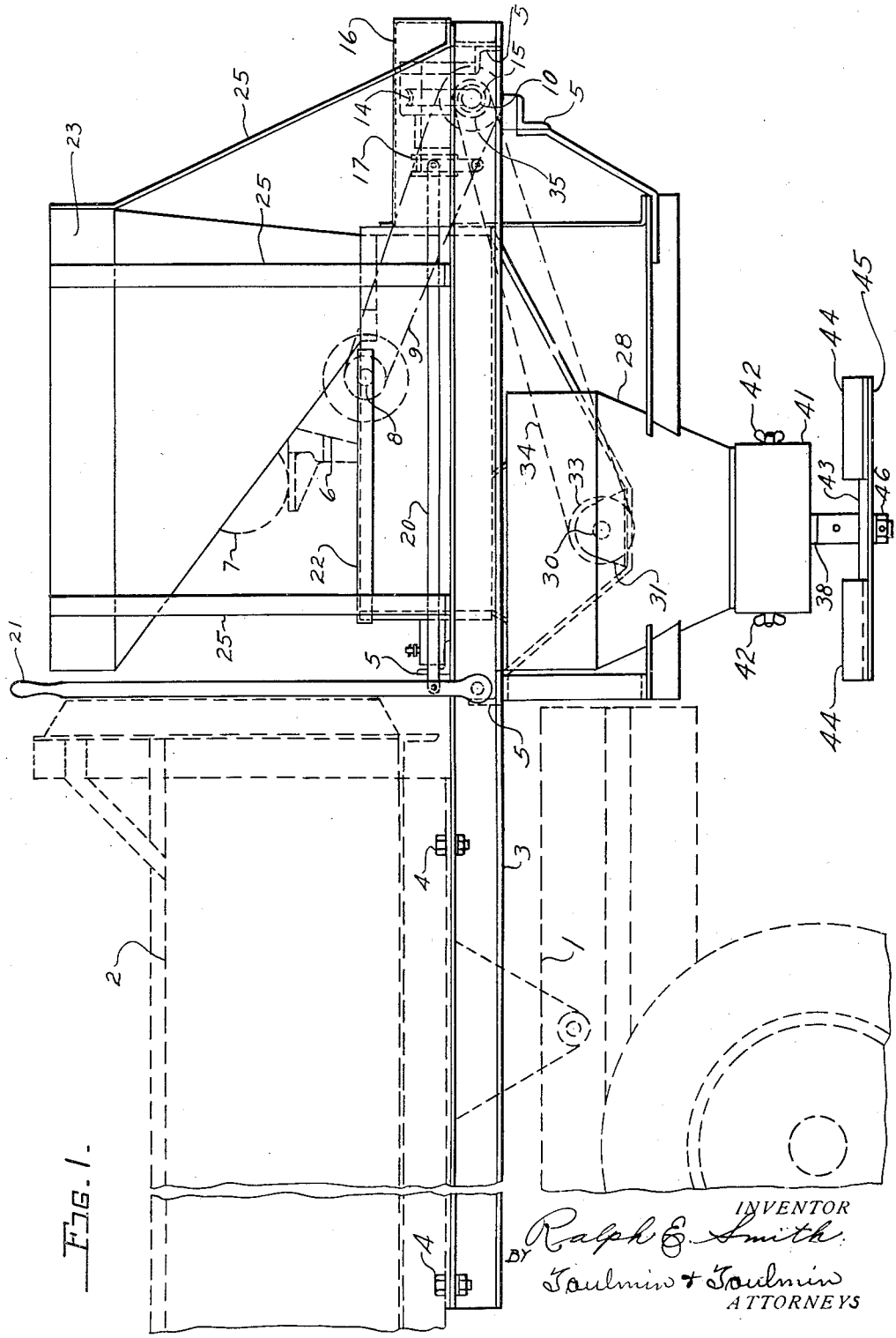
Figure 1 is a side elevation showing the spreader attached to one end of a dump truck, the rear end of which is partly shown.

As shown in Figures 1 and 2, the present spreading apparatus is attached to the rear end of a truck 1, the dump body of which is indicated by the numeral 2. The spreader is supported on a frame which includes two side bars 3 attached to some part of the dump body by means of bolts 4. In the present instance there are four of these bolts, two on each side of the dump body. These side bars are connected by suitable cross bars 5.

Supported on the frame composed of the various bars and at one side of the spreader is a motor 6, which has connected thereto a gas tank 7. This motor has a shaft 8 with a sprocket on the end thereof for operating a chain 9, which extends from the sprocket on shaft 8 to another sprocket on a shaft 10, supported by bearings 11 on the frame. The shaft 10 is in two sections, which may be connected by means of a clutch 12 so that when the motor rotates the whole of shaft 10 may rotate or only a part thereof. This clutch is operated by means of a lever 12' and a link 12ª connecting the lever and the clutch.

On the end of the shaft 10, remote from the chain 9, is a worm 13 which engages a worm gear 14 on a shaft 15. The worm 13, the worm gear 14 and the adjacent parts of the shaft 10 and the shaft 15 are inclosed in a casing 16. By means of a clutch mechanism 17 the shaft 15 may be connected to a worm conveyor 18 located in a trough 19.

For operating the clutch 17 one end of a link 20 is attached to the clutch, while the other end of the link is attached to a lever 21 pivoted at one end to one of the side bars 3. On the upper end of this lever is a knob to be gripped by the hand for operating the lever 21. The trough 19, in which the worm conveyor works, is covered throughout the greater part of its length by means of a cover 22.

Supported above the trough is a feed hopper 23, which has an inlet or discharge opening 24 leading into an opening between one end of the trough and the cover 22. This hopper is supported on the frame by means of braces 25. The arch-shaped bottom of the trough is indicated by the numeral 26 and has an opening 27 in the end thereof opposite the inlet opening into the trough from the hopper 23. Immediately below the opening 27 and suitably supported with relation to the trough and the feed hopper 23 is a discharge hopper 28. This hopper receives the material from the trough through the opening 27.

Located in this hopper is a casing or housing 29, supported in any suitable manner. Supported by the housing or casing 29 is a shaft 30, which extends through one side of the discharge hopper and is supported on the outside end by means of a bearing 31 supported by some part of the frame. This shaft is also supported by a bearing 32 in the housing 29. Between the discharge hopper and the bearing 31 the shaft 30 has a pulley or sprocket 33 engaged by a sprocket chain or belt 34. This belt or sprocket 34 passes around a pulley or sprocket wheel 35 on shaft 10, between the clutch and the worm on the end of the shaft 10.

Within the housing 29 and on the inner end of shaft 30 is a gear 36, which meshes with a second gear 37 on a vertical shaft 38, supported by bearing 39 formed in the housing 29. On the upper end of shaft 30 is a cone-shaped disc 40 for distributing the material as it passes from the trough into the discharge hopper. This disc rotates whenever shaft 38 rotates through shaft 30.

On the lower discharge end of the discharge hopper 28 is an adjustable chute 41, adjustably supported thereon by means of thumb screws 42. On the lower end of the shaft 38 and below the chute 41 is a hub 43. This hub is permanently attached to the lower end of the shaft 38 and rotates with the shaft. This hub carries a plurality of radially extending vanes or ribs 44, as clearly shown in Figures 4 and 5. These vanes or ribs are formed integral with the hub member 43. Beneath the hub member 43 and the vanes or ribs 44 is a spreader disc 45, supported on the lower end of shaft 38 by means of a nut 46.

The material to be spread is taken from the truck body and placed in the receiving hopper by any suitable and convenient means. From this hopper 23 the material passes through the discharge 24, into the trough, from which it is conveyed by means of the worm conveyor 18 to the discharge hopper. As the material leaves the trough and enters the discharge hopper it comes in contact with the cone-shaped disc 40, which is rotating, so that the material is distributed to all parts of the discharge hopper and falls down and passes out through the lower or chute end of the discharge hopper. As the material passes out of the discharge hopper it comes in contact with the hub member, the vanes and the spreader disc. These are rapidly rotating, due to the rotation of shaft 38, so that the material therefrom is spread. In order to vary the area over which the material may be spread discs of different sizes may be used. Also the length of the vanes or ribs may be varied.

It will be understood that I desire to comprehend within my invention such modifications as come within the scope of my claims and my invention.

Having thus fully described my invention, what I claim as new and desire to secure by Letters Patent, is:

1. In a spreader, in combination with a truck body and a source of power, means removably attached to the body for receiving material from the body and discharging it, said means including a pair of hoppers, a trough connecting the hoppers and a conveyor in the trough, and means operated by the source of power to spread the material as it is discharged from one hopper.

2. In a spreader, in combination with a truck body and a source of power, means removably attached to the body for receiving material from the body and discharging it, said means including a pair of hoppers, a trough connecting the hoppers and a conveyor in the trough, and means operated by the source of power to spread the material as it is discharged from one hopper, said means comprising a disc and a rotating vane on the disc.

3. In a spreader, in combination with a truck body and a source of power, means removably attached to the body for receiving material from the body and discharging it, said means including a pair of hoppers, a trough connecting the hoppers and a conveyor in the trough, and means operated by the source of power to spread the material as it is discharged from one hopper, said means comprising a horizontally disposed disc and a plurality of vertically disposed rotating vanes on the disc.

4. In a spreader, in combination with a truck body and a source of power, a receiving hopper removably attached to the body for receiving material from the body, a discharge hopper, means connected to the source of power for delivering the material from one hopper to the other, and means connected to the source of power for distributing the material as it enters the discharge hopper.

5. In a spreader, in combination with a truck body and a source of power, a frame adapted to be attached to the body, hopper means on the frame adapted to receive material from the body, and means operatively connected to the source of power to first distribute the material as it enters the hopper and then scatter it as it leaves the hopper.

6. In a spreader, in combination with a truck body and a source of power, a frame adapted to be attached to the body, hopper means on the frame adapted to receive material from the body, a shaft in the hopper means operatively connected to the source of power, a cone-shaped disc on the shaft to distribute the material as it enters the hopper means, and means on the shaft to spread the material as it leaves the hopper.

7. In a spreader, in combination with a truck body and a source of power, a frame adapted to be attached to the body, hopper means on the frame adapted to receive material from the body, a shaft in the hopper means operatively connected to the source of power, a cone-shaped disc on the shaft to distribute the material as it enters the hopper means, and means on the shaft to spread the material as it leaves the hopper means.

8. In a spreader, power means, a receiving hopper, a discharging hopper, a trough having communication at one end with the receiving hopper and at the other end with the discharging hopper, a conveyor in the trough to move material from one hopper to the other, means in the discharging hopper to distribute material as it enters the discharging hopper and spread it as it leaves the discharging hopper, and means to connect the conveyor and the last-named means to the power means.

9. In a spreader, power means, a receiving hopper, a discharging hopper, means to convey material from one hopper to the other, a shaft in the discharging hopper, means operated by the shaft to distribute material as it enters the discharging hopper, means operated by the shaft to spread the material as it leaves the discharging hopper, and means to connect the power means to the shaft whereby the shaft is rotated.

10. In a spreader, a hopper adapted to receive and discharge material, a vertically disposed shaft in said hopper, a cone-shaped disc on the upper end of the shaft to distribute material as it is received into the hopper, a disc and vanes on the lower end of the shaft to spread the material as it is discharged from the hopper, and means for rotating the shaft.

11. In a spreader, a hopper for receiving and discharging material, a vertically disposed shaft in said hopper, a cone-shaped disc on the upper end of the shaft to distribute material as it is received into the hopper, a plurality of vanes fixed to the lower end of the shaft, and a spreader disc on the shaft beneath the vanes, and means to rotate the shaft.

12. In a spreader, a hopper having a receiving inlet and a discharging outlet, an adjustable extension on the outlet to assist in directing the material leaving the hopper, a shaft extending through the outlet into the hopper, a cone-shaped disc on one end of the shaft adjacent the inlet for distributing material passing in at the inlet, spreading means on the shaft below the outlet, and power means for rotating the shaft.

13. In a spreader, a frame, a hopper, means in the hopper to distribute material as it enters the hopper, means supported by the frame for spreading the material as it leaves the hopper, and power means on the frame for operating the distributing means and the spreading means.

14. In a spreader, a frame, a receiving hopper on the frame, a discharge hopper on the frame, means to convey material from one hopper to the other, means to distribute the material as it enters the discharge hopper, and power means supported on the frame for operating the conveyor means and the distributing means.

15. In a spreader, a frame, a pair of hoppers on the frame, a trough extending from one hopper to the other, a conveyor in the trough to move material from one hopper to the other, means to distribute the material as it leaves the conveyor, and power means on the frame to operate the conveyor and said means.

16. In a spreader, a frame, a pair of hoppers, a trough extending from one hopper to the other, a conveyor in the trough to move material from one hopper to the other, means to distribute the material as it leaves the conveyor, means to spread the material as it leaves the hoppers, and a motor on the frame to operate the conveyor and said two means.

17. In a spreader, a frame, a pair of hoppers, a trough extending from one hopper to the other, a conveyor in the trough to move material from one hopper to the other, means to distribute the material as it leaves the conveyor, means to spread the material as it leaves the hoppers, a shaft for supporting and operating said two means, and a motor on the frame for operating the conveyor and the shaft.

18. In a spreader, in combination with a truck body, a frame having side bars adapted to be attached to the body, a hopper on said frame for receiving material from the body and discharging it, a shaft in the hopper having thereon means to distribute the material as it enters the hopper, and means to spread the material as it leaves the hopper, and means to rotate the shaft.

19. In a spreader, in combination with a truck body, a frame having side bars adapted to be attached to the body, a hopper on the frame adapted to receive material from the body and discharge it when the frame is attached to the body, means to distribute the material as it enters the hopper, means to spread the material as it is discharged from the hopper, and means mounted on the frame for operating each of said means.

20. In a spreader, in combination with a truck body, a frame having side bars adapted to be attached to the body, a hopper on the frame adapted to receive material from the body and discharge it when the frame is attached to the body, means to distribute the material as it enters the hopper, means to spread the material as it is discharged from the hopper, and a motor means mounted on the frame for operating each of said means.

RALPH E. SMITH.